June 3, 1969

C. E. KAWCHITCH 3,447,392

TORQUE TRANSMISSION SHAFTS

Filed Oct. 11, 1967

United States Patent Office 3,447,392
Patented June 3, 1969

3,447,392
TORQUE TRANSMISSION SHAFTS
Claude Edward Kawchitch, 1 Palmer St.,
Jolimont, Victoria, Australia
Filed Oct. 11, 1967, Ser. No. 674,452
Int. Cl. F16h *57/00;* G05f *1/04*
U.S. Cl. 74—411                                8 Claims

ABSTRACT OF THE DISCLOSURE

Torque transmission shaft comprising a core of a non-metallic material sheathed by tubular sleeve of metal, the core and the sleeve being torsionally coupled together at or adjacent one end of the shaft only.

BACKGROUND OF INVENTION

Field of invention

This invention relates to torque transmitting elements and is concerned particularly with torque transmission shafts.

Prior art

The production of many types of mechanical equipment involves the manufacture of large numbers of identical gear and shaft assemblies and great cost savings could be achieved if the gears and shafts of these assemblies could be moulded from plastic materials. For example, in a common type of roller conveyor drive system, each roller of the conveyor is provided with a shaft fitted with a worm gear and the worm gears engage a series of worms mounted on a common drive shaft. If the roller shafts and worm gears could be largely moulded from plastic materials great savings could be achieved. Furthermore plastic shafts could deform to cushion torsional shock loading on starting or sudden loading of the conveyor. However, it has hitherto not been possible to use plastic shafts in situations where they would be subject to bending loads because of poor resistance of plastic materials to bending stresses. The present invention has resulted from an attempt to solve this problem.

Summary

According to the invention, a shaft for the transmission of torque comprises a core of a non-metallic material sheathed by a tubular sleeve of metal, the core and the sleeve being torsionally coupled together at or adjacent one end of the shaft only. With such a shaft, the core can transmit torque while the sleeve provides most of the resistance to bending and prevents bending failure in the core.

In order that the invention may be more fully explained, part of a roller conveyor drive mechanism which embodies the invention will now be described in detail with reference to the accompanying drawings.

Description of preferred embodiment

Figure 1:
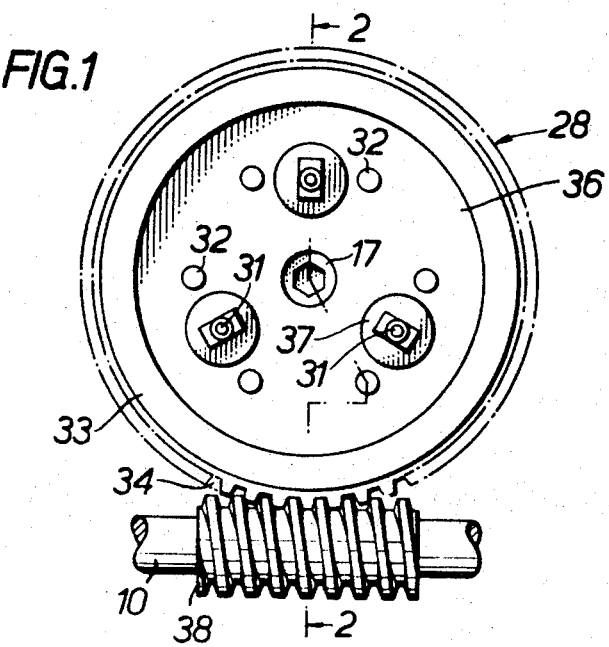
FIGURE 1 is an end elevation of part of a worm gear drive for a conveyor roller.
Figure 2:
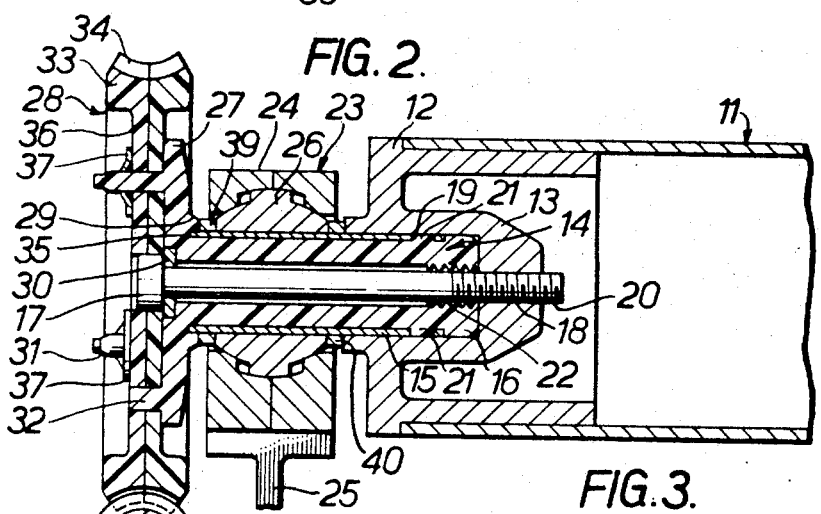
FIGURE 2 is a cross-section taken on the line 2—2 in FIGURE 1.
Figure 3:
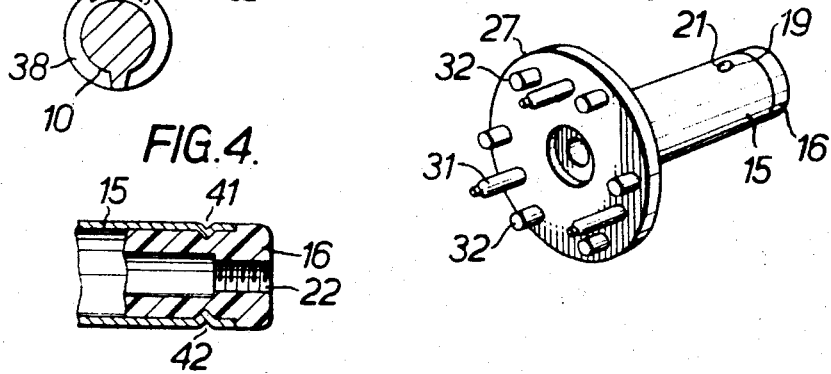
FIGURE 3 is a perspective view of a flanged shaft incorporated in the roller drive and constructed in accordance with the present invention.

Conveyor roller 11 is one of a plurality of horizontal rollers arranged side by side along the conveyor and each provided with a shaft fitted with a worm gear, the worm gears engaging a series of worms on a common drive shaft 10. Roller 11 has an end cap 12 which comprises a central cup 13 to receive one end of a shaft denoted generally as 14.

Shaft 14 comprises a metal sleeve 15 and a hollow core 16 which extends through the sleeve and is moulded from a plastic material, for example a polycarbonate or an acetal resin. A bolt 17 extends through core 16 and its screw thread 20 engages an internal thread 18 formed in cup 13. Bolt 17 is tightened against a washer 30 located in an annular recess in core 16 at the other end of the shaft so that core 16 and sleeve 15 are drawn into cup 13.

At the end of the shaft which fits within cup 13, core 16 and sleeve 15 are torsionally coupled together by the engagement of a pair of bosses 21 on the core with a pair of diametrically opposite holes 19 in the sleeve. However, over the remainder of the length of the shaft there is no torsional coupling between the core and the sleeve, the core being a free fit within the sleeve. Sleeve 15 is a forced interference fit in cup 13.

Core 16 is provided at one end with an internal screw thread 22. This does not engage thread 20 of bolt 17, being of a larger size, and is provided merely to engage an extractor tool on dismantling of the roller drive.

The shaft is journalled for rotation in a journal bearing which is denoted generally as 23 and is bolted to a frame 25 of the conveyor. Bearing 23 comprises a body 24 having a part-spherical socket which houses an appropriately shaped sleeve 26. This bearing is of the type more fully described in my co-pending U.S. patent application No. 674,302 and plays no part in the present invention.

A flange 27 is moulded integrally with the outer end of shaft core 16 to serve as a mounting for a worm gear denoted generally as 28. The inner face of flange 27 has a land 29 provided with an annular groove 35 which receives the end of sleeve 15. The outer face of the flange is provided with three relatively long pegs 31 and six relatively short pegs 32. Worm gear 28 is moulded in two identical halves from a plastic material which may, for example, be a polycarbonate or an acetal resin. The two halves are placed together to form an outer rim 33, having worm gear teeth 34 moulded into its outer periphery, and a central flange portion 36 having nine holes to receive pegs 31, 32 on flange 27. Pegs 32 extend right through gear flange 36 and are fitted with spring clips 37 to hold the worm gear on the shaft.

Worm gear 28 engages a worm 38 on the worm shaft 10. This shaft extends longitudinally of the conveyor and is provided with a separate worm adjacent each roller to engage a worm gear coupled to the roller in the same manner as illustrated in the drawings. A packing washer 39 is located between flange 27 and bearing sleeve 26 and a further packing washer 40 is located between bearing sleeve 26 and roller cap 12 and the whole assembly is held together by tightening nut 17.

In operation of the conveyor, worm 38 drives worm gear 28 which is coupled to the outer end of shaft core 16 via flange 27. The inner end of shaft core 16 is coupled to roller 11 by virtue of the interference fit between cup 13 and sleeve 15 and the coupling between the sleeve and the core provided by the holes 19 and bosses 21. Thus the end of sleeve 15 within cup 13 serves as a shear coupling. However, it is to be noted that there is no torsion in the remainder of the sleeve, the torsion being transmitted from gear 28 along the core through the sleeve to the shear coupling. The sleeve provides cost of the bending resistance of the shaft and prevents bending failure in core 16. The torsional resilience of core 16 absorbs any torsional shocks which may occur on stopping and starting or on sudden loading of the conveyor. If the shaft were constructed entirely of metal, such shocks would not be absorbed and could cause failure of gear teeth or other components of the drive mechanism.

Figure 4:
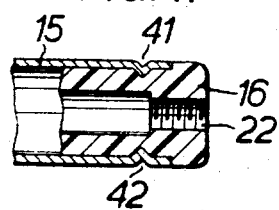
FIGURE 4 is a longitudinal section through one end of a slightly modified form of shaft constructed in accordance with the invention.

FIGURE 4 illustrates an alternative method of connecting sleeve 15 to core 16 at one end of the shaft in which the sleeve is merely crimped or indented inwardly into the core at two diametrically opposed locations 41, 42.

The illustrated construction, by providing a shaft and worm gear which utilizes moulded plastic components enables great savings to be achieved in the cost of a complete conveyor installation. However, this specific construction has been given by way of example only and may be varied. For example core 16 could be moulded from a hard natural rubber instead of a synthetic plastic material. It is accordingly to be understood that the invention is in no way limited to the specific construction described but includes all variations which fall within the scope of the appended claims.

I claim:
1. A shaft for the transmission of torque from a drive means to a driven means, said shaft comprising a core of non-metallic material sheathed by a tubular sleeve of metal, the core and the sleeve being torsionally coupled together only within a region at one end of the shaft, said core including a portion, spaced from the region where the core is coupled to the sleeve, which includes means for torsionally coupling the core to the drive means.

2. A shaft as claimed in claim 1 in which said drive means comprises a gear, said means on the core being adapted to mount the gear such that the gear will be torsionally coupled to the core.

3. A shaft as claimed in claim 2, in which said means comprises a flange on said core is located at the end of the shaft remote from said region.

4. A shaft as claimed in claim 3, in which the flange is provided with an annular groove which receives an end of the sleeve.

5. A shaft as claimed in claim 1, in which the core is constituted of a plastic material.

6. A shaft as claimed in claim 1, in which in said region the core is provided with an outward projection and the sleeve is provided with an opening which receives the projection thereby to provide the torsional coupling between the core and the sleeve.

7. A shaft as claimed in claim 1, in which the sleeve is indented against the core in said region thereby to provide the torsional coupling between the core and the sleeve.

8. In a drive in which the driven means is a conveyor roller, a shaft as defined by claim 1 journalled at a location between the ends of the sleeve in a bearing, said one end of the shaft being coupled to the roller and the core being coupled at the other end of the shaft to the drive means which is constituted as a gear.

References Cited

UNITED STATES PATENTS

| | | | |
|---|---|---|---|
| 2,849,871 | 9/1958 | Moeller | 64—27 X |
| 2,851,892 | 9/1958 | Parkinson et al. | |
| 2,868,033 | 1/1959 | Gaither | 74—411 X |
| 3,167,967 | 2/1965 | Silberger | 74—411 |

LEONARD H. GERIN, Primary Examiner.

U.S. Cl. X.R.

29—516, 525; 64—27